United States Patent [19]
de Montebello et al.

[11] Patent Number: 4,732,453
[45] Date of Patent: Mar. 22, 1988

[54] INTEGRAL PHOTOGRAPHY APPARATUS AND METHOD OF FORMING SAME

[75] Inventors: Roger L. de Montebello; Ronald P. Globus; Howard S. Buck, all of New York, N.Y.

[73] Assignee: Integrated Images, Inc., New York, N.Y.

[21] Appl. No.: 680,342

[22] Filed: Dec. 10, 1984

[51] Int. Cl.$^4$ .................. G02B 27/22; G02B 27/00; B29D 11/00; G03B 35/08

[52] U.S. Cl. .................................. 350/130; 350/167; 350/320; 354/115; 264/2.4

[58] Field of Search ............ 350/130, 131, 143, 167, 350/320, 417; 354/110, 118, 120, 122; 264/1.1, 1.7, 2.2, 2.4, 2.5, 2.7

[56] References Cited

U.S. PATENT DOCUMENTS

| | | | |
|---|---|---|---|
| 2,854,337 | 9/1958 | Pearson | 350/167 |
| 3,365,524 | 1/1968 | Thompson et al. | 350/167 |
| 3,503,315 | 3/1970 | De Montebello | 350/167 |
| 3,584,369 | 6/1971 | De Montebello | 350/167 |
| 3,724,924 | 4/1973 | Lenfant et al. | 350/167 |

*Primary Examiner*—John K. Corbin
*Assistant Examiner*—Vincent J. Lemmo
*Attorney, Agent, or Firm*—Krass & Young

[57] ABSTRACT

A method is disclosed of forming apparatus for use in a three stage integral photography process that includes a camera for taking the integral photographs; printing apparatus for converting the psuedoscopic negative produced by the camera into an orthoscopic positive; and a viewing screen for the positive. The apparatus comprises arrays of lenslets formed on transparent plastic sheets and plates with arrays of apertures on the same centers as the lenslets and the elements must have very precise dimensional relationships to one another. In the method, all of the elements are produced by symmetrical, multi-stage processes using the same array of elemental mold parts in the first stage in the process. One elemental mold part or "Janus plug" is provided for each optical element in the array. The plugs consist of hexagonal-sided bars, each having one end formed with a domed side used in the formation of the viewing screen and an opposite cylindrically recessed side used to receive spherical inserts for forming the camera array and annular bushings used to form inserts in the camera/printing apparatus.

4 Claims, 9 Drawing Figures

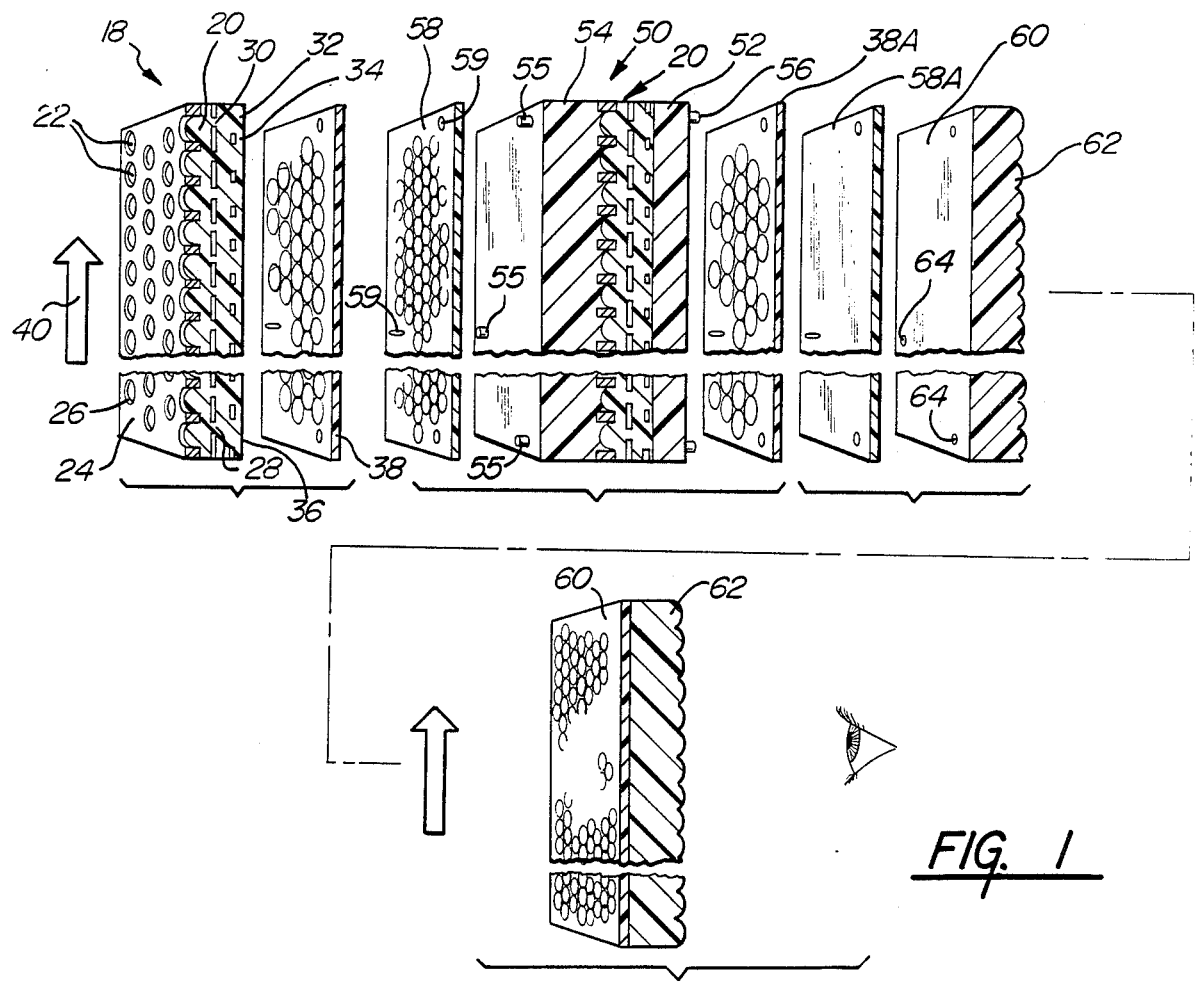
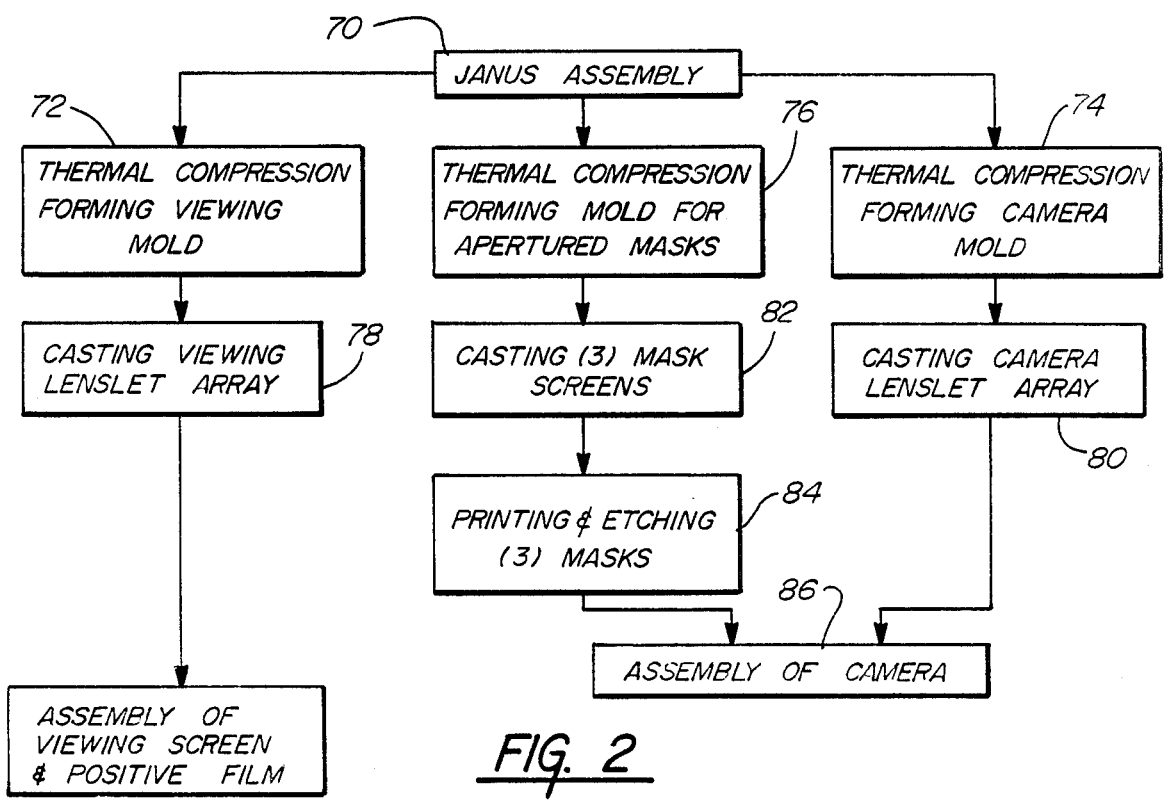
FIG. 1
FIG. 2

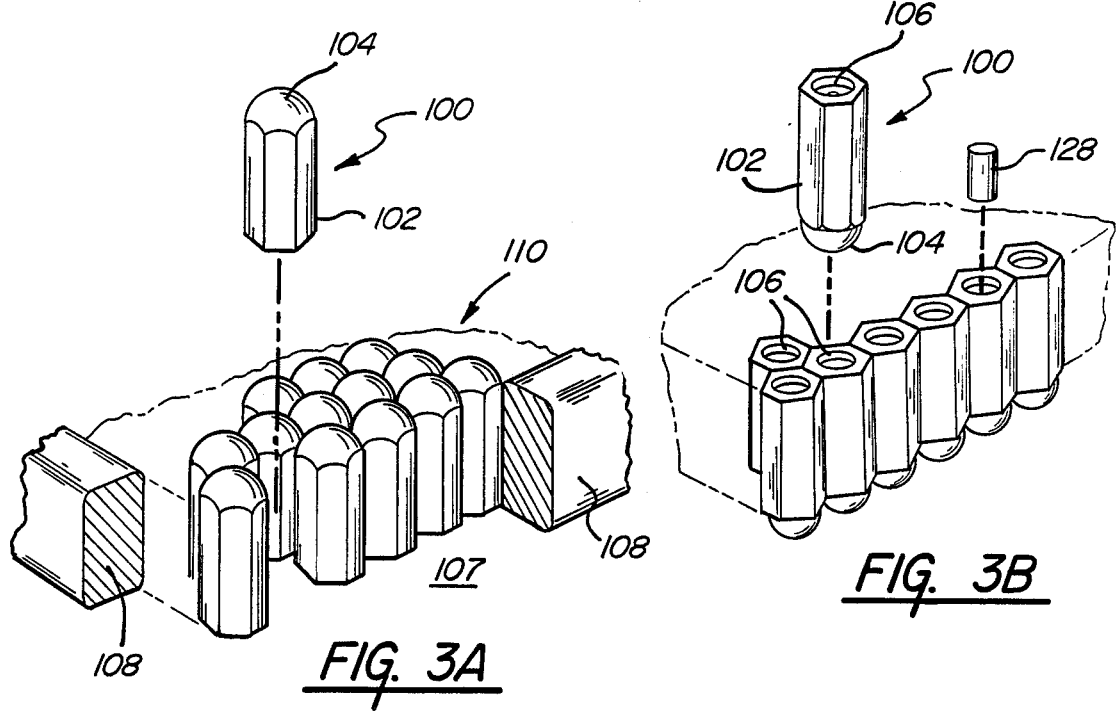
FIG. 3A
FIG. 3B
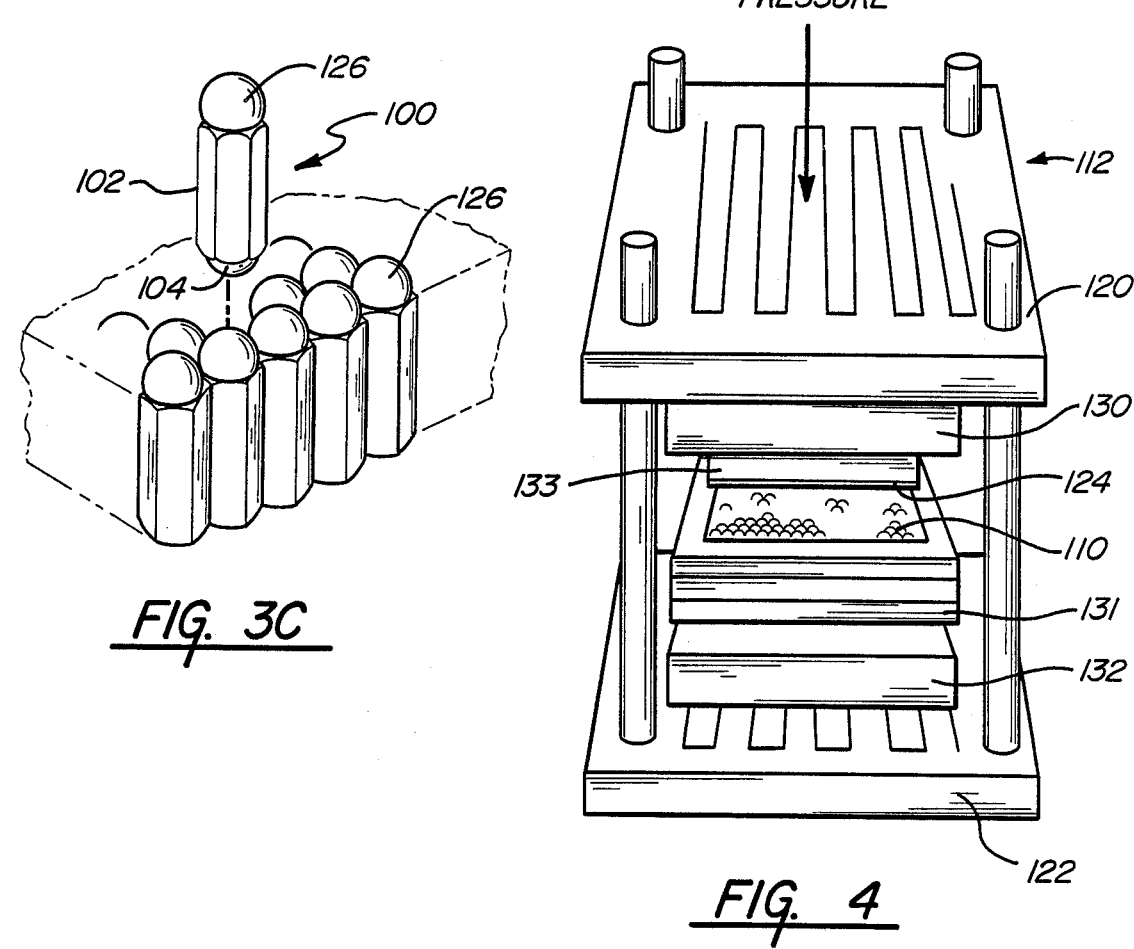
FIG. 3C
FIG. 4

INTEGRAL PHOTOGRAPHY APPARATUS AND METHOD OF FORMING SAME

BACKGROUND OF THE INVENTION

1. Field of the Invention

This invention relates to a method of forming integral photography apparatus for use in obtaining and reproducing three-dimensional images of scenes; and more particularly, to a method of forming all of the components of the apparatus by a series of symmetrical and coaxial steps beginning with the use of a common multi-element molding apparatus.

2. Background of the Invention

A variety of systems for forming and viewing integral photographs have been proposed. One class of such systems, which are the subject of the present invention, involves at least two stages: in the first stage, a scene or object is photographed by exposing a sheet of photographic film through a camera consisting of a plate of transparent plastic having an array of small semi-spherical lenslets formed on its forward face, and opaque sheets with apertures formed on the same axes as the lenslets and acting as irises and field stops adjacent to or embedded within the plate. When the scene is photographed in this manner and the photographic sheet is developed, an array of images is formed, one for each lenslet, each recording the scene from a slightly different viewing orientation.

When this array of images is viewed through a screen of lenslets similar to the camera screen, the viewer perceives an integrated image of the scene in which each lenslet provides a detail of one aspect of the scene. The detail produced by each lenslet depends upon the angle of the observer's eye relative to the screen so that the observer's two eyes produce a stereoscopic image, giving the feeling of depth. As the viewer's head moves relative to the screen the contribution to the integrated picture provided by each lenslet changes so that the observer effectively views the photographed object from different angles, exactly as if viewing the object itself. This effect may be referred to as "look around".

As originally proposed, the integral photography method produced a pseudoscopic image of the scene, i.e. where there is a reversal of the depth along the visual axis relative to the actual image of the scene. It was later proposed that an intermediate process step be interposed between the taking and viewing of the integral photograph. In this intermediate or "printing" stage, each elemental image on the photographic medium is rephotographed through the lenslet of an array to achieve a conversion of the pseudoscopic into a proper orthoscopic positive.

The apparatus required for this three step process thus consists of a camera, a printing apparatus, and a viewing screen. The same lenslet array used in the camera can be employed to advantage in the printing operation but a separate lenslet array must be used in the viewing screen since the focal length of the camera lenses is designed for paraxial rays while the focal length of the lenslets of the viewing screen is designed for predominantly off paraxial and marginal rays. Furthermore the lenslets of the viewing screen desirably contact one another while the lenslets of the camera are spaced from one another. The camera employs at least two, and preferably three opaque sheets formed with arrays of holes arranged on the same axes as the lenslets. These sheets act as irises and field stops and may be formed of a rigid material to reinforce the camera structure.

A complete system for taking, printing and viewing integral photographs thus requires a plurality of components each formed on a planar array and having a very precise dimensional relationship to the other component arrays. The problem of producing all of these components with the required precision of relationship relative to one another is complicated by the interaction between the nature of the materials which must be employed for the lenslet arrays and the effects of the required processing steps on the dimensions of these materials. Particularly, because of considerations of transparency and index of refraction, the choice of material for the lenslet-containing plates is limited to a few plastics. Moreover, these plates would be very difficult to produce by any processes other than thermal molding or casting. Both of these processes result in shrinkage of the material so that the completed arrays are on different centers than the masters used to form the array.

As a result of these and related factors, it is extremely difficult to produce adequate apparatus for taking, printing, and viewing integral photographs. This is even more difficult if the parts are to be produced with a production process that will result in a relatively low cost operation.

SUMMARY OF THE INVENTION

The present invention is accordingly directed toward a method of producing all of the components of apparatus for taking, printing, and viewing integral photographs that overcomes the difficulty of maintaining constant array dimensions among the various components and does it in a manner that is relatively low in cost and compatible with mass production.

To understand the method of the present invention, it is convenient to consider the components which must be produced as consisting of three groups: the taking-and-printing lenslet array; the apertured sheets and plate which are assembled with the taking-and-printing lenslet array to form the camera/printer; and the viewing lenslet array. In the method of the present invention, each of these three component groups is produced by a multi-stage process beginning with the use of a single, common molding array formed of a plurality of identical master elements, one for each lenslet of the resulting array. The three groups of elements are then produced by symmetrical processes wherein each group undergoes similar molding and casting operations so that the shrinkages associated with these operations are imposed equally on each of the components.

The master elements which are assembled into an array used in the initial stage of processing each of the three major component groups of the invention preferably consist of elongated, hexagonally sided metal plugs having one end formed as a spherical dome and the other end formed with a central, cylindrical recess. Because both of the ends or "faces" of the plugs are used in the various molding operations, we will hereinafter refer to them as "Janus" plugs. The spherically domed ends of the Janus plugs have substantially the same radius of curvature as desired for the lenslets in the viewing array. The radius of curvature of the lenslets is dictated by optical considerations and is preferably approximately 3 millimeters. The width of the plugs between parallel sides is about 5 mm. A number of Janus plugs equal to the number of lenslets in a desired array, typically about 2,400 in a typical 40×60 element array, are assembled on a flat metal slab into an adjustable frame to form a compression molding master.

This Janus array is used in a heated compression molding press to form three masters, one for use in forming each of the groups of components of the system. The domed ends of the plugs of the Janus array are used to compression mold a high density polyethylene sheet into a negative master to be used in casting the viewing screen. The cylindrically recessed ends of the Janus plugs are used to compression mold a master array of cylindrical male protrusions that is used in turn in a casting process to produce three plates having cylindrical recesses. These plates are employed in the process of forming iris and field stop sheets which will be embedded within the camera screen and a more rigid apertured lens hood sheet which will lie over the lenslet face of the camera with each lenslet protruding partway through one of the apertures in the hood. The cylindrically recessed ends of the Janus plug array are also used in the process of compression molding a negative master for use in casting the camera plate with lenslets of a smaller radius of curvature than the viewing screen lenslets. Spherical elements such as high grade bearing balls having a diameter very slightly smaller than the pitch of the Janus array are placed to rest on the edge of the cylindrical recesses to create a male master for compression molding the camera casting plate with its array of concave elements.

Thus, the process of producing each of the three groups of elements begins with the identical array of Janus plugs, continues with identical compression molding operations which produce the same controlled shrinkage of the array in each of the three groups, and then continues further with casting operations that produce a second controlled shrinkage of the array for each group of parts.

While the Janus array represents a very close approximation of the symmetry of the ideal configuration, it will inevitably deviate to a certain degree from the ideal configuration. Were each of the arrays of the system independently constructed in accordance with this ideal, the discrepancies between arrays would produce mismatches between the elements of the system which would seriously affect the performance of the integral photography process. The use of a single master to construct all of the elements insures that they will all deviate in the same manner from the ideal and will thus match one another despite these common deviations.

The three cast plates with cylindrical recesses that result from casting polyester resin into the compression molded sheet having cylindrical protrusions are used in the process of producing the iris and field stop sheets and the lens hood plate by photolithographic processes. Since the apertures in any one of these three apertured elements must all have the same diameter which must be different from the diameter of the apertures of the other elements, while formed on the same centers, the diameters of the recesses in two of the plates are modified by inserting in each of the recesses of a particular cast plate annular bushings having outer diameters equal to the diameters of the cast plate recesses. The annular bushings placed in one of the plates have larger apertures than the bushings placed in the other plate. These three cast plates are transparent but the spaces between are painted an opaque black. They are then used as masks to produce the apertured iris and field stop sheets and the lens hood plate. The lens hood plate is formed by exposing a photosensitized layer (photoresist) on a copper sheet through the cast plate and then etching out the center holes of the aperture pattern. The iris and field stop sheets are formed as photographic film negatives having an array of transparent holes, but they are preferably formed of copper sheets like the lens hood plate but thinner.

The apertured sheets and plate are assembled with the cast camera lenslet array screen by embedding them in cast layers of the same transparent plastic used to form the lenslet array.

Two other related structural arrangements are used to maintain the universal alignment of all of the elements which is necessary in the process. For example, allowing the apertured sheets in the camera to be joined in proper relationship; allowing the photographic film to be appropriately secured to the camera during the taking stage and resecured to the camera in proper position during the printing operation; and allowing the resulting positive to be secured first to the printing assembly and then to the viewing screen. One of the two congruent arrangements involves the provision of four aligning devices, each located midway along one edge of the array (and thus termed "cardinal devices"), beginning in the Janus assembly and following through each of the successive processing stages, so that the aligning elements in the final assembly undergo the same shrinkages as the other array elements. In the second related arrangement, the photographic film sheets and/or copper sheets used in forming the iris and field stop sheets as well as the film sheets used in the taking and printing stages are provided with a certain form of punched apertures which allows alignment with the four cardinal elements. The punch configuration consists of four oblong elements having their major axis directed toward the center of the sheet. A combination of these slotted sheets and the cardinal devices assures easy fit and proper alignment between the sheet and the other elements of the system, even when residual small differences exist. The effect of the cardinal arrangement is to maintain all the elements properly centered relative to each other, as well as to simply allow them to fit on the same devices even when their dimensions differ slightly.

The symmetry of processing of the three groups of elements of the invention, along with the unique cardinal devices and punching arrangement results in the production of an integral photography system with the required accuracy and coaxiality of alignment between the elements in a manner that is amenable to mass production.

Other objectives, advantages, and applications of the invention will be made apparent by the following detailed description of a preferred embodiment of the invention. The description makes reference to the accompanying drawings in which:

FIG. 1 is a schematic, perspective view of the integral photography apparatus produced by the method of the present invention;

FIG. 2 is a block diagram illustrating the broad steps of the method of forming integral photography apparatus;

FIG. 3A is a detailed, perspective view, partially broken away for purposes of illustration, of one corner of the Janus plug assembly used with the present invention, illustrating the domed ends of the plugs;

FIG. 3B is a similar detailed view of the opposite, cylindrically recessed ends of the Janus plug assembly;

FIG. 3C is a view similar to that of FIG. 3B with balls inserted in the cylindrical recesses;

FIG. 4 is perspective view of a thermal compression-molding press which employs the Janus plug assembly to mold casting masters for various of the camera components;

DETAILED DESCRIPTION OF INVENTION

Figure 5:
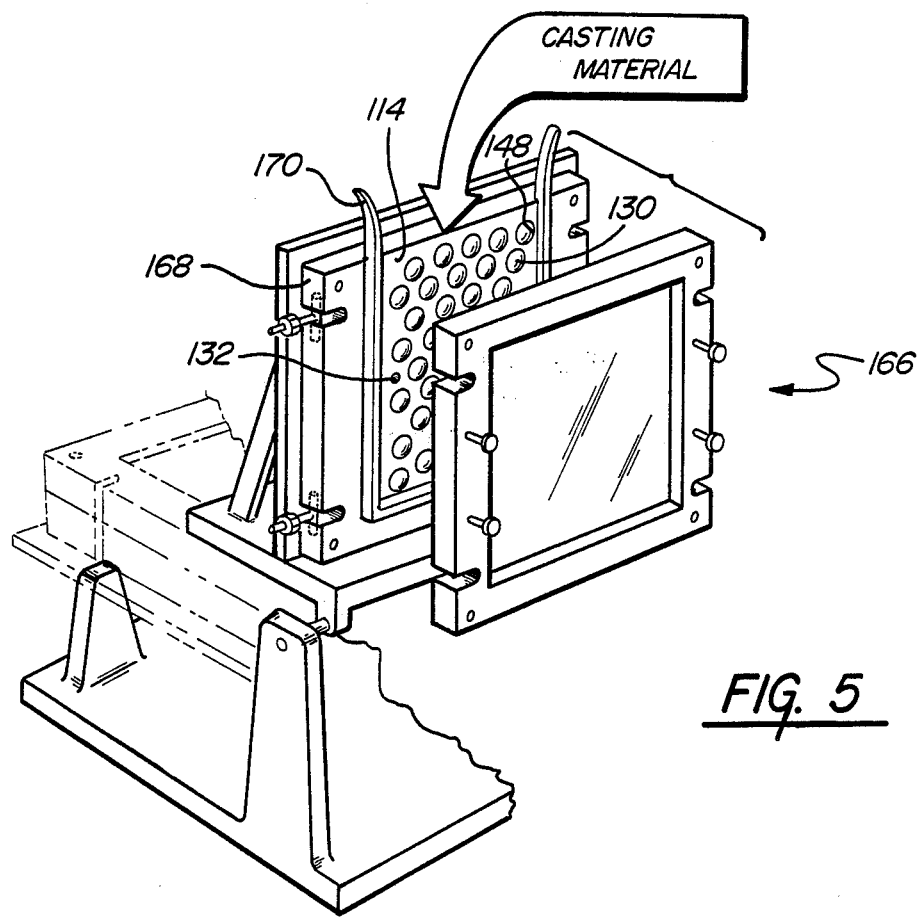
FIG. 5 is a perspective view, partially broken away, of the molding apparatus used to cast various sheets used in the process of the present invention.

The preferred embodiment of the present invention is directed toward the method of manufacture of the equipment used in a three stage integral photography process of the type generally disclosed in U.S. Pat. No. 3,503,315.

The camera used in the process, generally indicated at 18 in FIG. 1, consists of a rectangular plate 20 of transparent plastic, preferably a polyester resin having a refractive index greater than about 1.5, such as "Polylite" manufactured by Reichhold Chemicals of White Plains, N.Y. One face of the plate 20 is formed with an array of semi-spherical lenslets 22 formed so that the center of each lenslet is equally spaced from the centers of its six neighboring lenslets. This type of array is usually described as "triangular" or "honeycomb". The diameters and pitch of the lenslets are determined as a compromise between the visibility of the array on one hand and the available resolution of the summation image which resolution increases in direct proportion to the increase to the lenslet size. The preferable useful diameter of the lenslets in the viewing stage is approximately 5 millimeters for an average viewing distance of 2–3 meters, and the useful diameter of the lenslets 22 of the camera 18 is somewhat less, about 4 millimeters, and there are flat lands a planar interstices lying between the lenslets.

A lens hood plate 24, consisting of a copper sheet of a thickness of approximately 0.8 millimeter, etched with an array of apertures 26 having the same axes as the lenslets 22 and diameters slightly in excess of the lenslet diameter, overlies the forward face of the plate 20 so that one of the lenslets 22 projects partway through each of the apertures 26 in the lens hood. The lens hood acts to mechanically reinforce the camera and to block the passage of light rays through the interstices between the lenslets, as well as to prevent the surface of the lenslets from coming into contact with a spacer plate to be used at the printing stage.

The camera 18 further includes an iris sheet 28 preferably formed of a thin copper sheet (about 0.12 mm) etched with an array of holes 30 formed on the same centers as the lenslets 22. The iris sheet is embedded within the plastic resin of the plate 20, to coincide with the locus of the lenslet's centers of curvature, i.e. at a distance of about 2.32 mm from the surface of the lenslets. The holes 30 in the iris sheet are substantially smaller in diameter than the lenslets 22, e.g. 0.5 mm, and they act as irises for the rays transmitted by each individual lenslet. A field stop sheet 32, preferably formed of a thin copper sheet (about 0.12 mm) has an etched array of circular holes 34 formed on the same axes as the lenslets, and it is also embedded within the plastic camera sheet 20 spaced approximately 1.75 mm. beyond the iris sheet 30 or an amount such that the field stop circles 34 define light cones having the irises as apices and whose bases are located on the rear surface of the camera and have diameters such that they are almost tangent to each other. In the present case the field stops diameters are about 2 mm.

The rear surface of the camera 18 is planar and has four cylindrical protuberances 36, each spaced about midway along one of the longitudinal edges of the camera plate 20. The protuberances are positioned on the axes of predetermined symmetrical lenslets on each of the four sides.

The photographic material used with the camera consists of a rectangular sheet 38 of photosensitive material having four punched holes formed midway along each of its four sides. The holes are oblong and have their major axis pointing toward the center of the sheet. They are positioned over the cylindrical protrusions 36 to secure the photographic sheet 38 to the rear of the camera 18.

With an appropriate shutter for the camera system and/or electronic flash sources to illuminate a subject 40 (open flash method), the camera is designed to form an array of contiguous focused images of the subject 40 on the photographic sheet 38 with one image being associated with each lenslet and its corresponding holes in the lens hood 24, iris sheet 28, and field stop sheet 32. The field stop ensures that the light forming one of the focused images on the photographic plate is limited to light passing through the lenslet associated with that image and does not impinge upon neighbor images. The photographic sheet is then processed by conventional and well-known techniques to produce a film negative containing an array of images of the object, each from a slightly different angle.

Were this negative to be converted into a positive and then viewed through the viewing screen, the observer would see an integrated real image of the object having an aspect which depends upon and varies with the position of the observer relative to the screen, but this image would be pseudoscopic, with an apparent inversion of distances along the axis between the observer's eye and the real image. In accordance with the teachings of the prior art, the present system converts a potentially pseudoscopic negative, produced on development of the film sheet 38, into a positive capable of generating an orthoscopic, usually virtual, image through use of the printing apparatus, generally indicated 50.

The printing apparatus makes use of the camera 20 sandwiched between a pair of spacer plates 52 and 54, that may be formed of the same material as the camera. The rectangular plate 52 has a forward planar surface which abuts the rear surface of the camera and has four oblong recesses placed to engage the camera's pins 36 and four cylindrical protuberances (pins) 56 on its rear surface at the cardinal points where the negative 38A produced upon development of the film sheet 38 may be supported. The spacer plate 54 has one surface adjacent the lens-hood of the camera, with four protuberances at the cardinal points, that engage corresponding recesses in the lens-hood, and the other surface has corresponding protuberances 55 such that another sheet of photographic film 58, with the oblong holes 59 punched at the cardinal points, may be supported on its outer surface. The thickness of the plates is such that the negative 38A and the potential positive sheet 58 are supported at conjugate focal planes of the lenslets of the camera so that when appropriately lighted one inverted image is formed on the positive sheet 58 corresponding to and of the same size as each image of the negative sheet 38. This individual inversion converts the pseudoscopic summation image that would otherwise be produced by the sheet 38A into the desired orthoscopic summation image.

After suitable development, the developed positive sheet 58A is supported on the rear surface of a viewing screen 60 having an array of lenslets 62 on its forward face. The lenslets of this array are designed with a radius of curvature greater (about 3.3 mm.) than that of the lenslets employed in the camera so that the viewing lenslets' convex surfaces intersect one another along very thin straight lines forming tangent hexagone that appear to merge with one another. The viewing screen 60 has four recesses 64 at the cardinal points whereby the positive sheet 58 may be located by four separate pins while being cemented or embedded within the viewing screen. When the viewer observes the positive images through the lenslets of the viewing screen 60 a summation image which is virtually indistinguishable from the object is seen.

The apparatus as described, with the exception of the self-aligning mechanism for registering the camera and printer parts and for supporting the film sheets on the camera, printing apparatus and viewer, is similar to the prior art. The present invention is directed toward a unique process for producing this photography apparatus in a precise yet economical manner.

The broad process of the present invention is schematically illustrated in FIG. 2. The Janus plug assembly 70, which will subsequently be described in detail, is employed in three separate thermal compression molding operations. The domed end of the Janus plug assembly is used to form a mold for casting the viewing screen. The opposite side of the Janus plug assembly, with spherical members disposed in the cylindrical recesses, is used to form a mold for casting the camera lenslet array in an operation 74. That same side of the Janus assembly array is used to compression mold bumpy master which is subsequently employed in casting three discrete recessed mask screens, in an operation 76. These three thermal compression molding operations utilize the same materials and are conducted under similar temperature and pressure conditions so that the shrinkages in the molds formed in each of these three operations are substantially identical.

The three molds produced in the operations 72, 74 and 76 are then used in identical casting operations 78, 80 and 82 to form, respectively, the viewing screen lenslet array, the camera lenslet array and three screens for use as masks. These three casting operations 78, 80 and 82 again use identical materials. The times and temperatures are adjusted according to the thickness and configuration of the different casts so that the shrinkages of the arrays which inevitably occur during these casting operations are equivalent for all three stages.

Next, the three recessed mask screens produced by the operation 82 are used to print the iris and field stop sheets and the camera lenslet hood plate in an operation 84. One of the mask screens is used directly as formed in the printing operation for the formation of the camera lenslet hood plate. For the other two three printing operations used to form the iris and field stop sheets, the recesses of the screens are filled with annular bushings having different diameter central voids. Finally, these sheets and plate and the camera lenslet array produced in operation 80 are assembled into the camera/printing assembly in an operation 86.

Referring to FIGS. 3A, 3B and 3C, the Janus elements which are assembled into an array to form a thermal compression molding master are generally indicated at 100. The Janus elements are preferably formed of a non-corrosive metal such as stainless steel by high precision machining and polishing and each has an elongated hexagonal body 102 terminating in a semi-spherical domed end 104. The opposite ends of the Janus plugs are flat, with a cylindrical recess 106 formed along the central axis of the plug.

A number of the Janus plugs, one for each lenslet in the resulting camera/printer and viewer are joined in a triangular array on a flat 107 lapped metal slab with their hexagonal sides abutting one another and tightly held together by an adjustably rectangular outer frame 108 shown broken away in FIG. 3A. The number of Janus elements 100 assembled in the array, generally indicated at 110, depends upon the size of the photograph desired and, conveniently, the array may contain about 40 rows of about 60 elements for an 8"×10" film size (200 mm×250 mm).

FIG. 3A illustrates one section of the domed end of the Janus plug array; FIG. 3B illustrates one section of the opposite end of the array; and FIG. 3C illustrates one section of the same side of the array illustrated in FIG. 3B with spherical balls 126 loaded into the cylindrical recesses 106 in the Janus plug for use in casting the camera lenslet sheet as in operation 80.

The Janus assembly 110 is then used in compression molding apparatus, generally indicated at 112 in FIG. 4, in three separate compression molding operations to form three high density polyethylene molds; 114 (FIG. 5) for use in casting the camera screen; 116 for use in casting plates used in forming the iris and field stop sheets and camera lens-hood plate, and third, similar in appearance to 114. used in casting the viewing screen. The compression molding apparatus 112 may be conventional, using well known techniques, and the compression molding press illustrated and described is intended to be representational.

The compression molding apparatus includes a pair of heating platens 120 and 122 each of which supports one of a pair of large lapped plates 130 and 132 that in turn each carry one of a pair of smaller lapped plates 131 and 133, configured to fit between the edges of the framed array 110. The plate 131 serves as a support for the array and the plate 133 serves as a piston having undercut grooves on its underside and four edges to allow it to firmly grip a plastic sheet to be molded and to prevent undersirable edge lift off would distort the molded product. In a preparatory thermal compressive step a sheet of polyethylene is arranged over the piston with the edges of the sheet engaging the undercut edges of the piston. In a subsequent heated compression operation the sheet is then thermally pressured into contact with the Janus assembly so as to force the polyethylene sheet into the exposed molding surface of the Janus plugs. Preferably a very thin sheet of fluorohalocarbon, such as Aclar, may be placed between the polyethylene sheet and the molding surface of the Janus plug assembly 108 to assist in separating the polyethylene sheet 124 from the molding surface after the molding operation without pulling out some of the plugs.

Considering the molding operation in which the casting mold sheet 114 for the camera screen is formed, the cylindrical recesses 106 in all of the Janus plugs with the exception of the four at the cardinal points, are loaded with spherical high grade (3 or 5) bearing balls 126 which have diameters very slightly smaller than the pitch of the array. The depth of the recesses 106 preferably is such that the balls 126 just fail to touch the bottom of these recesses. Four cylindrical plugs 128 (FIG. 3B) are placed in the recesses 106 of the four Janus plugs at the cardinal points and project substantially above the surface.

The molding operation is performed under closely controlled conditions of pressure, temperature and time resulting in master casting element 114 for the camera screen (FIG. 5). The element has about its surface an array of semi-spherical recesses 130 whose radius of curvature has been designed as a function of the refractive index of the material to be cast (such as polyester resin) and the pitch of the array. It has also four deep cylindrical recesses 132 at the four cardinal points.

The compression molding operation for forming the casting mold 116 for the apertured sheets and plates is similar, except that no balls 126 are placed in the recesses 106 in the Janus plug array and that these recesses are themselves used as the compression molding surface. At the four cardinal points, cylindrical tablets 128 are placed in the recesses so as to produce four cylindrical recesses 142 at the cardinal points in the cast sheet 116. The resulting compression molded sheet 116 has an array of cylindrical protrusions 140 formed on one of its sides and four recesses at the cardinal points.

The resulting compression molded sheet 116 has an array of cylindrical protrusions 140 formed on one of its sides and four recesses at the cardinal points.

The molding operation for forming the mold for casting the viewing screen is identical to the other two but uses the semi-spherical domed end 104 of the Janus array 110 as the compression mold. Again, four cylindrical tablets 128 will be cemented to one side of the casting mold. They will be shaped to form recesses in the flat block of the viewing screen mentioned above at the cardinal points. The resulting viewing screen casting master contains an array of concave semi-spherical elements on its forward face built with locating pins so that the cemented plugs will always face the corresponding cardinal points of the array (lenslet) face of the viewing screen cast in this mold. The concave semi-spherical indentations in the surface are substantially tangent to one another and the interstices between them have no appreciable width, unlike the pattern 130 formed on the casting master 114 for the camera screen wherein appreciable interstices exist between each of the semi-spherical concavities, but otherwise the viewing screen master is identical in appearance to the casting master 114.

In the compression molding operation, the polyethylene sheets shrink slightly as they have been heated. Since the time of the compression molding operation and the temperature of the materials are controlled in each of the three compression molding operations as a function of their configuration, the shrinkage that the array undergoes is substantially identical for all three operations. Accordingly, the arrays on the three casting molds, have an identical configuration, of a size slightly different from that of the configuration of the array of Janus plugs 108. Whereas, the Janus plug elements have a pitch of $P_1$ for the array, the arrays on the three cust sheets will all have a pitch of $P_2$ where $P_2$ is less than $P_1$.

In the next stage of processing, the three compression molded casting sheets are used as molds in identical casting operations to form the camera lenslet array 20, the iris and field stop sheet and the lens-hood plate 162 and the viewing screen 60. In each case a transparent plastic, preferably Polylite polyester resin, (32-035) is cast between the mold sheet and a glass plate. The curing time and temperatures of the casting processes are equivalent in the formation of each of the cast sheets so that the shrinkage of the plastic which inevitably occurs during the curing operation is substantially identical for all three stages, producing arrays having a pitch of $P_3$ which is less than $P_2$. Any residual differences (unavoidable but small) are absorbed by the device of the oblong cardinal holes, which control those differences along radial directions so that their effects are therefore minimized.

The casting apparatus may take any conventional form and a preferred apparatus is generally indicated at 166 in FIG. 5. The molding master illustrated as camera screen master 114, is supported in a base 168 with its casting surface upright and a gasket 170 is placed around three edges of the mold. A complementary cover plate to which is attached a glass plate is secured against the gasket with a variably controlled spacing between the complementary surfaces of the molding master such as to produce the desired thickness in the final cast plate and obviate the formation of shrink marks. Polylite polyester resin mixed with a catalyst (MEKP), is then poured into the casting mold. The temperature and time of jellying and curing are carefully controlled so that the operation for the three casts is equivalent in order to produce substantially identical shrinkages.

In order to produce the camera 18, the cast plate 162 must be used to produce the iris sheet 28, the field stop sheet 32 and the lens hood plate 24, and these must be assembled with the camera plate 20.

Considering first use of the plate 162 to form the apertured sheets, the plate 162 has an array of cylindrical recesses 194 formed over its surface with holes 197 passing through its surface at the cardinal points. One plate 162 may be used to form all three of the iris field stops and lens hood sheets and plate The plates 162 are used as printing masks. In the formation of the lens hood plate 24, the holes 34 have the same diameter as the cylindrical recesses 94. Accordingly, plate 162 may be used as a printing mask without the need for bushings by painting one surface with an opaque paint so that the recesses form transparent circles. A sheet of copper, coated with a photosensitive layer (photoresist) is secured to the rear face of the opaqued plate 162, to be exposed, developed and etched. In order to achieve its securement, the sheet is punched with four oblong holes at the cardinal points. The holes have a minor width substantially equal to the diameter of four cardinal pins which are inserted in the holes. The major axes of the holes are larger and are directed toward the center of the sheet so that the two holes on opposite sides of the sheet aim toward one another. The holes are positioned over the cardinal pins and the elongation of the holes allows adjustment of one axis for each opposed pair of slotted holes. Each pair also secures the sheet against movement in the axis of their minor dimension, securely retaining the sheet to the plate, while allowing for some radial expansion or contraction. The array of cardinal slotted holes thus achieves exact centering of the sheets with respect to their mating elements in the system, while allowing for inevitable difference between exact dimensions of the various elements because of shrinkage of the plastic which occurs during the curing operation. This specific cardinal arrangement of slots and pins is critical to the practice of certain aspects of the present invention.

Figure 7:
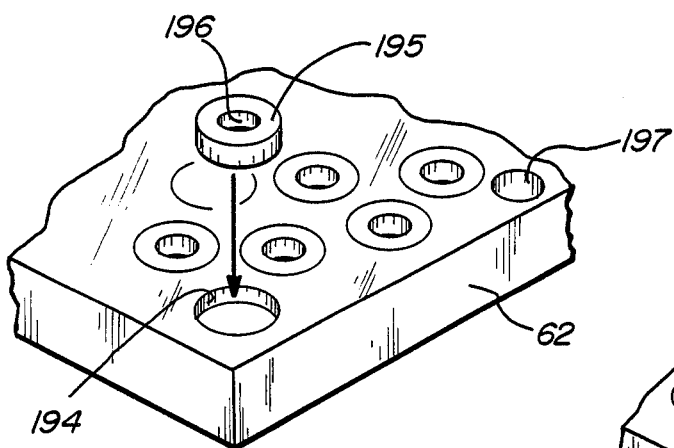
FIG. 7 is a perspective, detailed view of one corner of a cast plate fitted with bushings used to print the field stop sheet.
Figure 6:
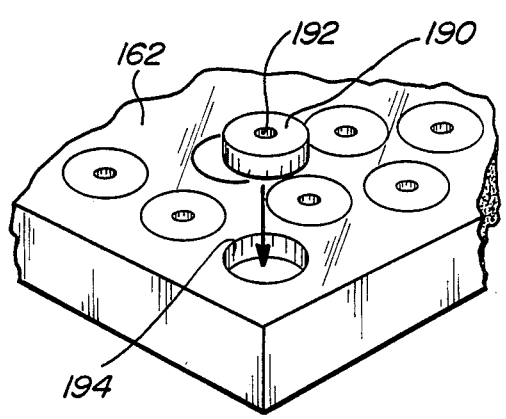
FIG. 6 is a perspective, detailed view of one corner of a cast plate fitted with bushings used to print the iris sheet.

To form the iris sheet 28 and the field stop sheet 32 bushings are placed in each of the holes 194 after the surface has been opaquely coated. As shown in FIG. 6 bushings 190 having small central apertures 192 are placed in the holes 194 to form the iris sheet and as shown in FIG. 7 bushings 195, of the same outer diameter, but having larger central apertures 196, are placed in the holes 194 to form the field stop sheet. In both the cases of the iris sheet and the field stop sheet, photographic film, such as Kodalith, having oblong punched cardinal points may be substituted for the copper sheet although the copper sheet is preferred.

With their required bushings in place the plates 162 are then used as masks in a printing operation to expose either the photoresist coating copper sheet or photographic film. In the case of the film, the exposed film is then developed and printed to produce opaque sheets having transparent holes of the appropriate diameter on the axes of the lenslet array. In the case of the cooper sheet, after development the sheet is etched in an acid bath to produce an arrayed pattern of circular holes.

Figure 8:
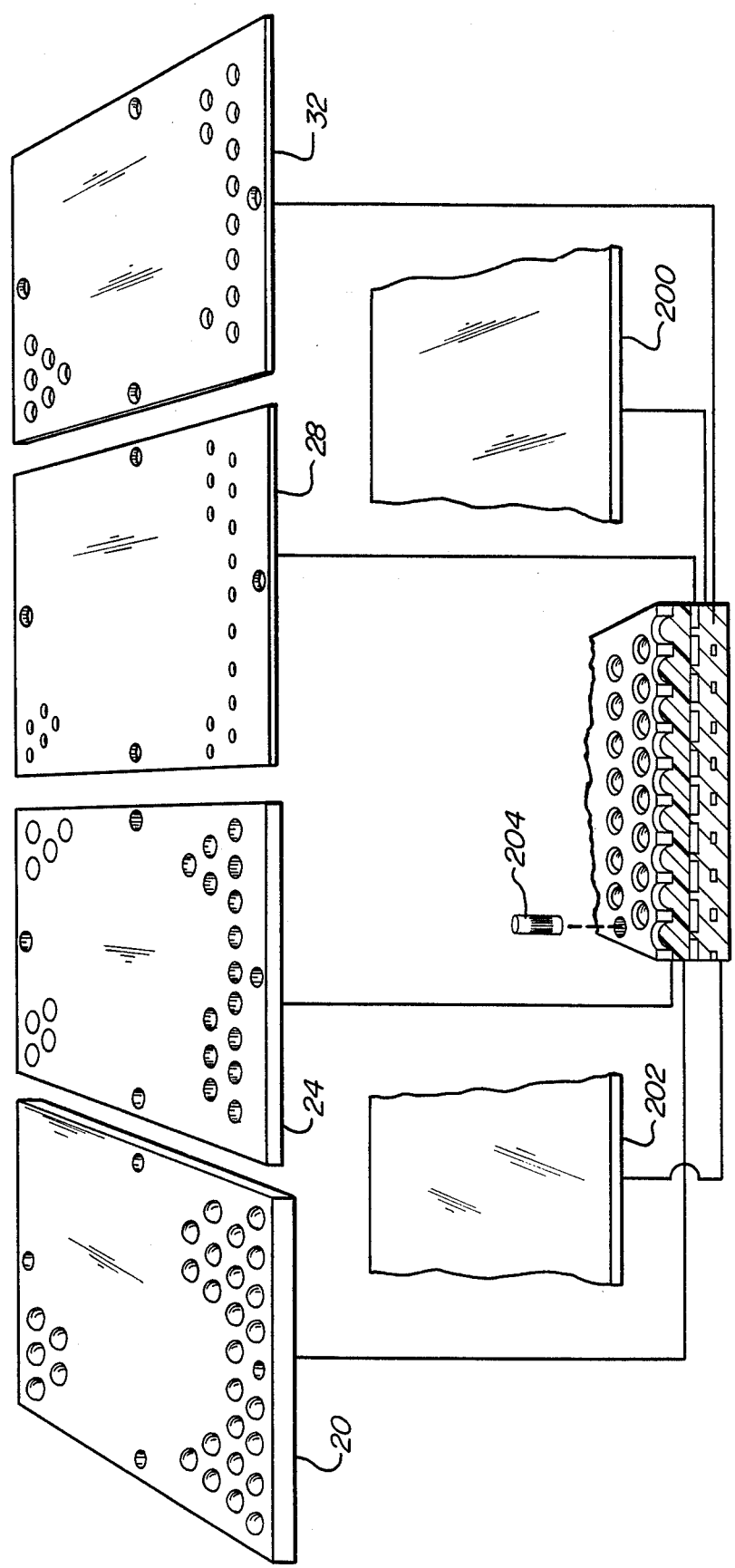
FIG. 8 is a schematic illustration of the manner of assembly of the various components to form the camera of the present invention.

The iris sheet 28, the field stop sheet 32, and the lenshood plate 24 are then assembled with the cast camera plate 20 in a operation as schematically illustrated in FIG. 8. Each of the elements to be assembled has oblong voids at the cardinal points. When photographic film is used for the iris and field stop sheets these voids are appropriately punched. When copper is used they are printed and etched.

In the final assembly the lens sheet is first arrayed over an appropriate fixture (not shown) having four cylindrical pins placed at the cardinal points. These pins are supported so that they have a resilient freedom of movement in the lateral direction. Using the casting material as an adhesive and the floating pin array as an aligning fixture the hood stop sheet is first cemented to the forward lenticular surface of the lenslet sheet. The iris sheet is then cemented to the flat rear surface of the lenslet sheet. Next a clear sheet of the plastic material, 200, of appropriate thickness is cemented over the iris sheet. Next the field stop sheet is cemented to the exposed side of the clear sheet 200 then a second clear sheet 202 is cemented to the exposed side of the field stop sheet in order to complete the assembly. In this operation the floating pins appropriately align all the arrays. After final assembly serrated pins 204 are pushed into the holes in the camera which previously accepted the aligning pins so that they protrude slightly from both surfaces to accept recesses in film to be used with the camera and spacer plates.

As thus assembled the camera/printing apparatus and the viewing screen are completed for use as previously described.

We claim:

1. The method of forming integral photograph apparatus which includes a camera comprising a transparent plate having an array of lenslets formed on one of its surfaces and sheets with arrays of image forming optics embedded within the plate, as well as a viewing screen for an integrated photograph, the viewing screen comprising a transparent sheet with an array of lenslets on one surface formed on the same axes as the lenslets of the camera and being larger in diameter, the method comprising:

creating a master array of a plurality of individual elements having semi-spherical domes at one end and recesses at the other end, the array being formed so that all of the domed ends form one surface of the array and the recessed ends form the opposite surface of the array;

molding the viewing screen by a process which utilizes the domed surface of the array as a master; and forming said sheets with arrays of image forming optics and said transparent camera plate by a process which uses the recessed end of the master array as a master.

2. The method of forming an integral camera comprising a transparent sheet with an array of lenslets formed on one side and perforated sheets having holes formed on the center of the lenslets embedded therein and additionally forming a transparent plastic viewing screen having a lenslet array on one face formed on the same centers as the lenslet array of the camera, said method comprising:

forming a master array having at least one surface formed with an array of elements located on the same centers as the lenslet arrays of the camera and viewing screen;

casting a viewing screen by a process which uses the master array as a master;

forming a plurality of perforated screens having apertures formed on the same centers as the master array by exposing photosentitively coated sheets through masks with an array pattern formed using the master array as a printing elements in a printing operation; and forming a camera with at least certain of the said perforated screens embedded therein using the master array as a mold in a molding operation.

3. The method of claim 2 wherein the master array is formed with an array of recesses on one surface and at least certain of the molding operations and printing operations involve disposing elements in each of the master array recesses.

4. A master array for use in forming an integral photography camera which includes a transparent screen having an array of lenslets formed on one surface, as well as an integral photography viewing screen comprising a transparent sheet having a similar array of lenslets formed on one surface, comprising:

a plurality of identical, elongated elements each element comprising a first domed end, a second, opposite socketed end, the domes and the sockets being formed along the central axes of the elements, and a polygonal configuration, symmetric about the central axis of the element, formed between the domed and socketed ends, whereby a plurality of the elements may be stacked with their polygonal surfaces in abutment to one another so that the domed ends form an arrayed surface and the socketed ends form a second arrayed surface on the same axes as the domed array surface, whereby a plurality of elements may be fabricated each employing an array based on the centers of the surfaces.

* * * * *

UNITED STATES PATENT AND TRADEMARK OFFICE
CERTIFICATE OF CORRECTION

PATENT NO. : 4,732,453

DATED : March 22, 1988

INVENTOR(S) : de Montebello et al

It is certified that error appears in the above-identified patent and that said Letters Patent is hereby corrected as shown below:

Column 8, line 59, "arranged" should read -- arrayed --.

Signed and Sealed this

Fifteenth Day of November, 1988

Attest:

DONALD J. QUIGG

Attesting Officer

Commissioner of Patents and Trademarks